Oct. 17, 1933.  V. S. FIRESTONE  1,931,185
MOLDING MACHINE
Filed June 13, 1931  6 Sheets-Sheet 2
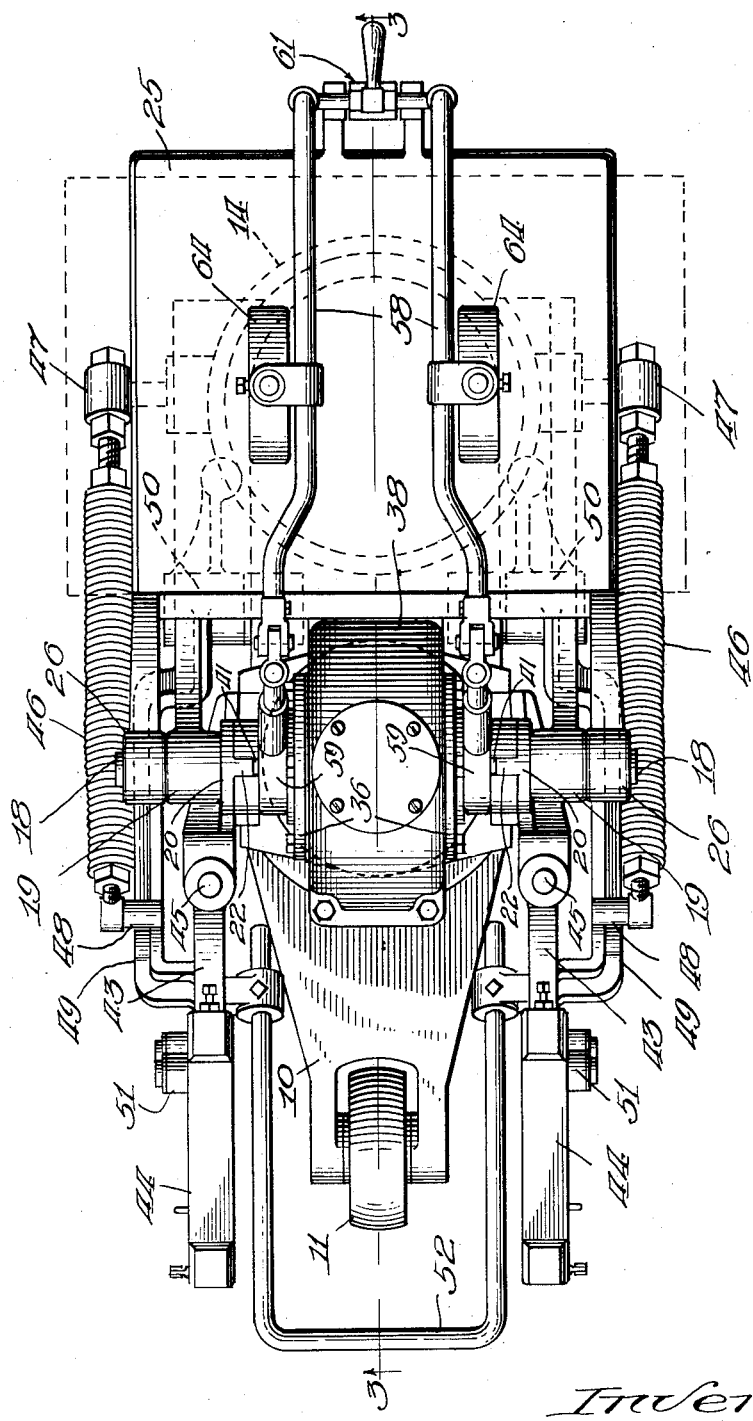
Inventor:
Vance S. Firestone
by Dyrenforth, Lee, Chritton & Wiles
Attys Oct. 17, 1933.  V. S. FIRESTONE  1,931,185
MOLDING MACHINE
Filed June 13, 1931   6 Sheets-Sheet 3
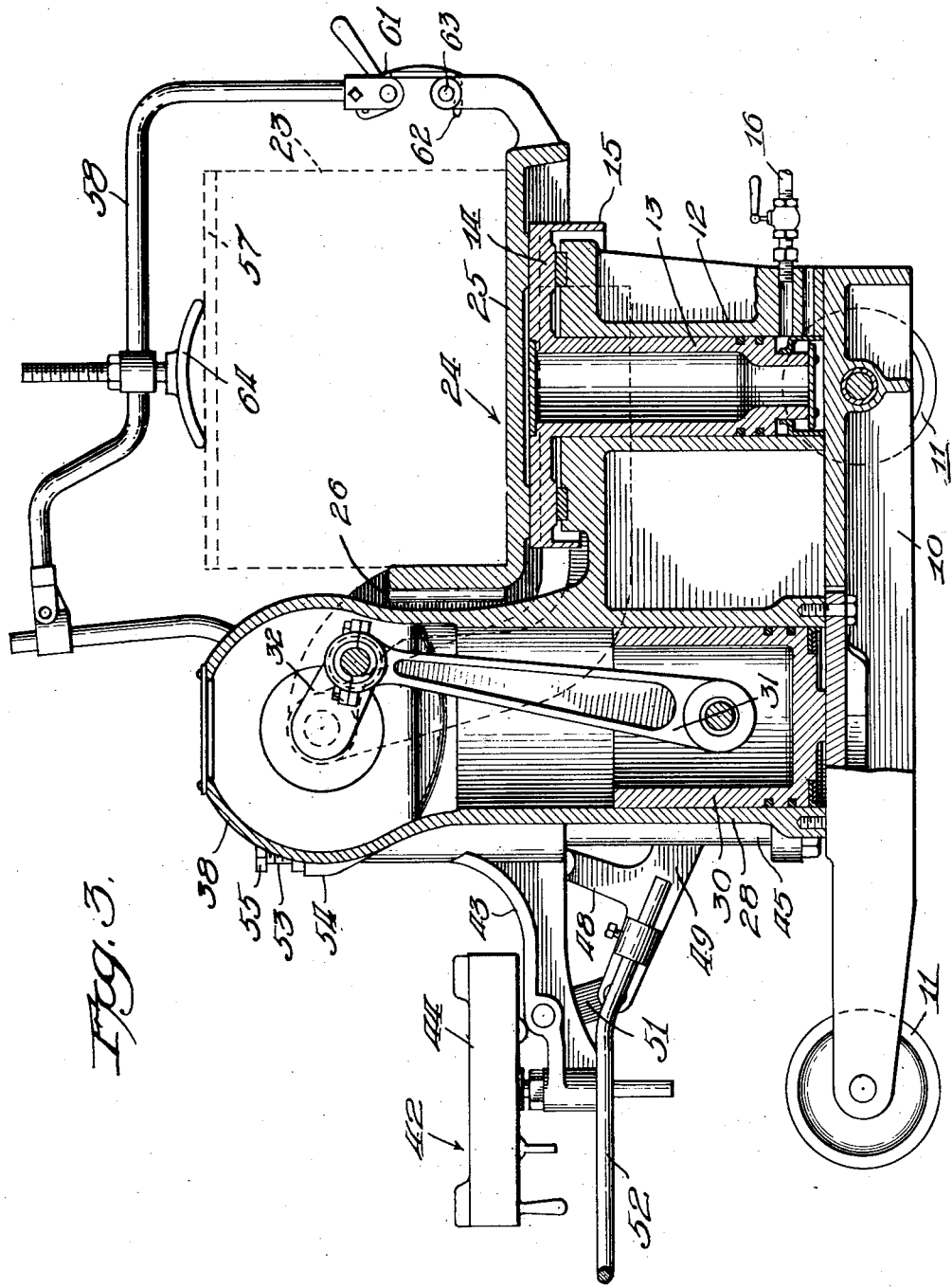
Inventor:
Vance S. Firestone
by Dyrenforth, Lee, Chritton & Wiles Oct. 17, 1933.  V. S. FIRESTONE  1,931,185
MOLDING MACHINE
Filed June 13, 1931    6 Sheets-Sheet 4
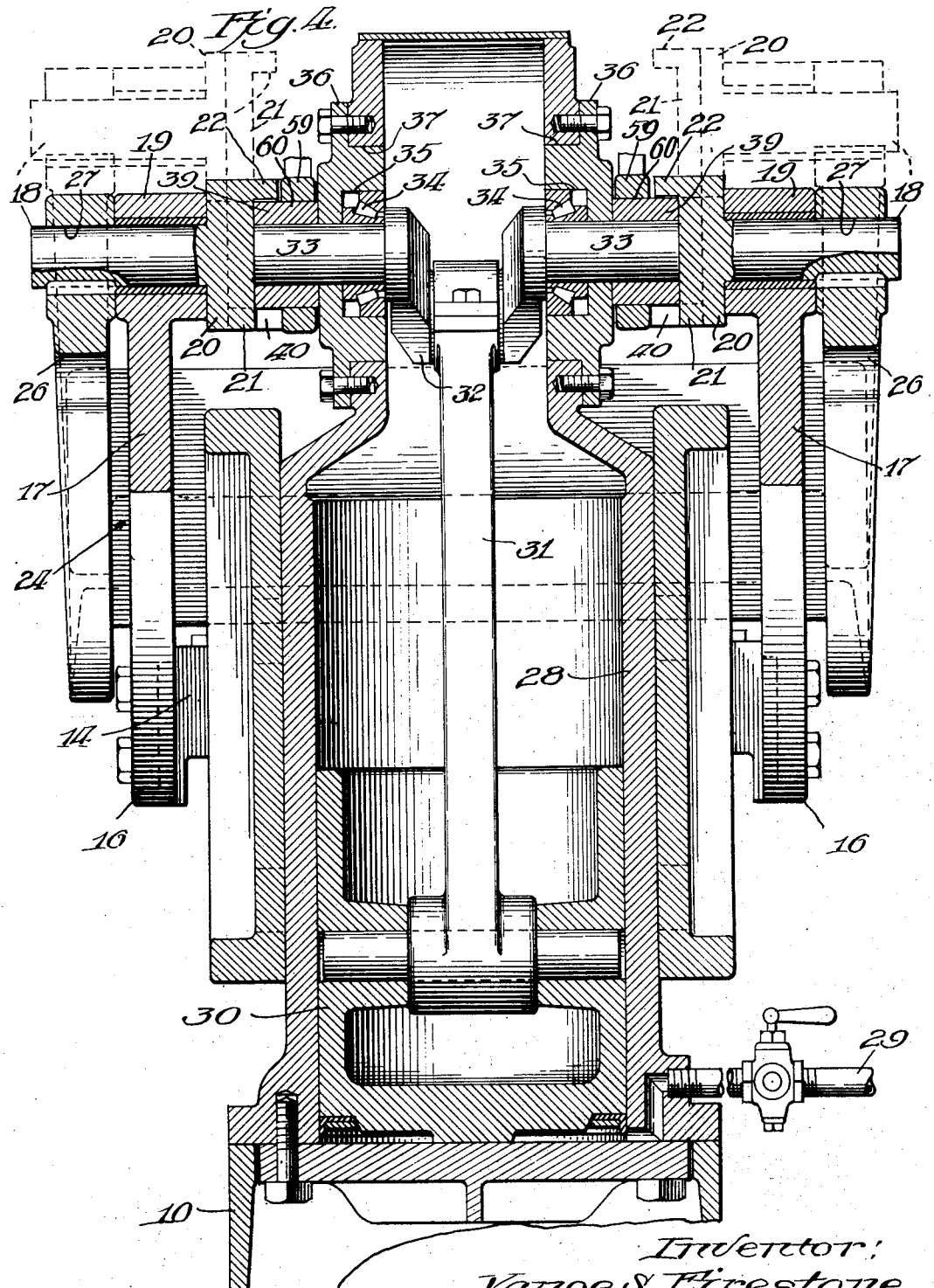
Inventor:
Vance S. Firestone
by Dyrenforth Lee Chritton and Niles
Attys Oct. 17, 1933.　　　V. S. FIRESTONE　　　1,931,185
MOLDING MACHINE
Filed June 13, 1931　　6 Sheets-Sheet 5
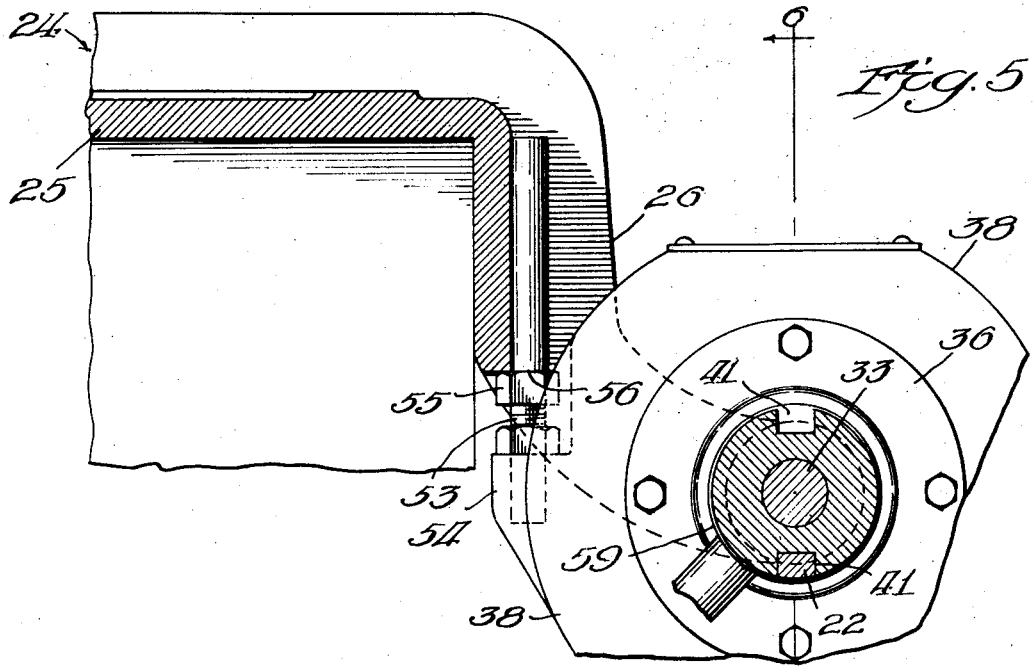
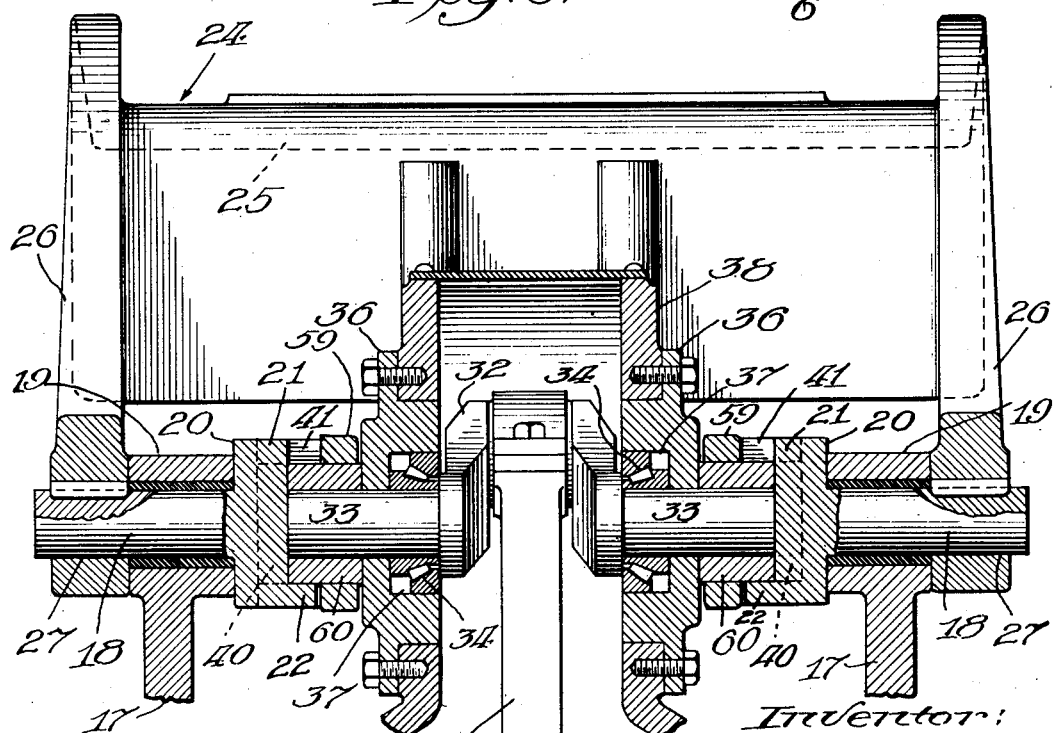
Inventor:
Vance S. Firestone
by Dyrenforth, Lee, Chritton and Wiles
Attys.

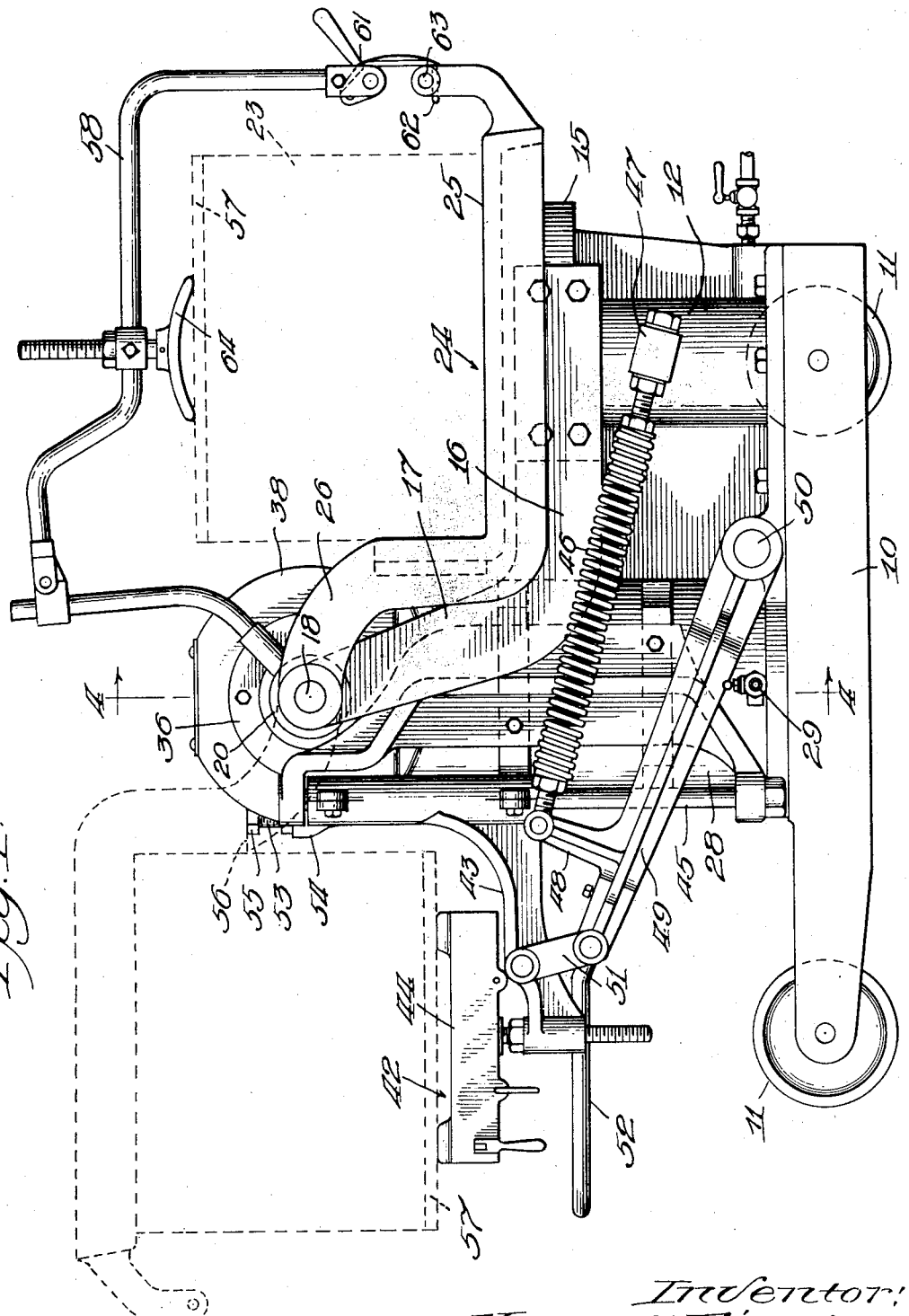

Oct. 17, 1933.  V. S. FIRESTONE  1,931,185
MOLDING MACHINE
Filed June 13, 1931  6 Sheets-Sheet 6
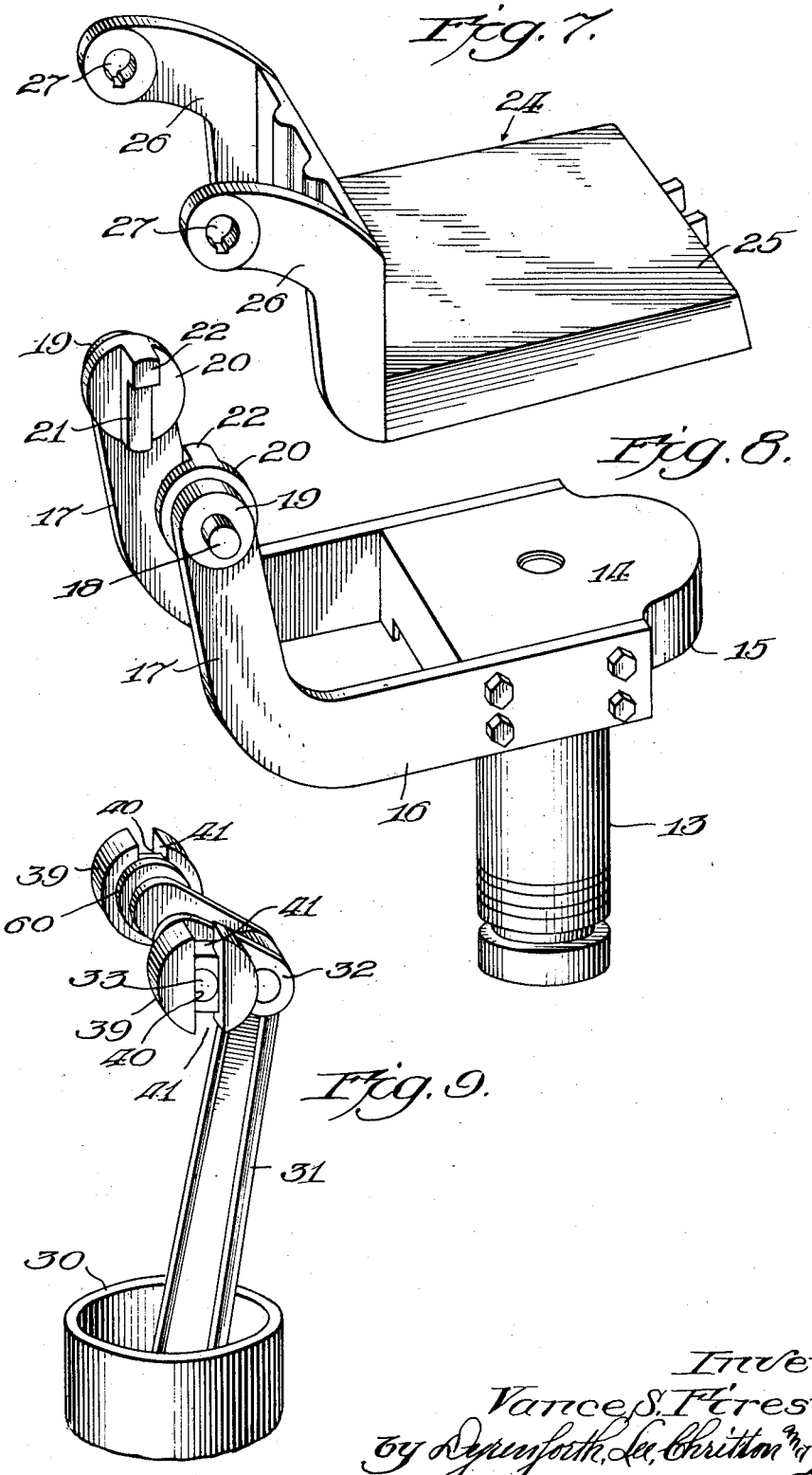
Inventor:
Vance S. Firestone
by Dyrenforth, Lee, Chritton & Wiles
Attys Patented Oct. 17, 1933

1,931,185

UNITED STATES PATENT OFFICE 1,931,185

MOLDING MACHINE

Vance S. Firestone, Freeport, Ill., assignor to Arcade Manufacturing Company, Freeport, Ill., a corporation of Illinois Application June 13, 1931. Serial No. 544,243

22 Claims. (Cl. 22—33)

My invention relates to molding machines of the type comprising a rotatably mounted carrier, as for example in the form of a table having the pattern secured thereto, on which the flask in which the mold is formed, is carried and which, in the operation of the machine, is bodily raised and lowered, as for example and more particularly, in the operation of jolting the mold to compact the sand therein, and as to certain features thereof more particularly to the so-called marginally hinged type of molding machine.

One of my objects is to provide improvements in machines of the type above referred to, and more especially machines of the marginally hinged type, to the end that the means for rotating the rotatable carrier will be disconnected from the carrier during the jolting operation, but connectible therewith, preferably automatically, to exert torque for rotating the carrier.

Another object is to simplify and render less expensive the manufacture of the portion of the machine comprising the cylinders forming parts of the jolting mechanism and the mechanism for separating the pattern from the mold.

Another object is to eliminate the inadequately guided and frequently locked loose parts necessary in jolt roll-over machines as heretofore provided, together with the incident wear and expense in connection with the same.

Another object is to provide the parts of the machine of such contour as to increase their strength and readily shed sand preventing entry thereof to the bearings and joints of the machine.

Another object is to provide in a marginally hinged type of machine for the removing of all load and strain from the jolting mechanism in the positioning of the carrier for separating the pattern from the mold.

Another object is to provide, in a machine in which the parts carried by the jolt piston are non-centered thereon, thus unsymmetrically loading the piston, for such distribution of the load on these jolt-parts as to counteract such unsymmetrical loading and render the total load on the piston substantially symmetrically disposed; and other objects as will be manifest from the following description.

Referring to the accompanying drawings:

Figure 1 is a view in side elevation of a molding machine of the marginally hinged carrier type embodying my invention, this view showing by full lines the position occupied by the carrier when in position to be jolted and in dotted lines the position to which it is rolled over for the drawing of the pattern.

Figure 2 is a plan view of the machine.

Figure 3 is a broken view in side elevation, with certain parts sectioned at the line 3—3 on Fig. 2 and viewed in the direction of the arrows, of the machine of the preceding figures, the parts being shown in the position illustrated in Fig. 1.

Figure 4 is an enlarged section taken at the line 4—4 on Fig. 1 and viewed in the direction of the arrows.

Figure 5 is a broken view in sectional elevation of the machine showing the carrier in pattern-drawing position.

Figure 6 is a section taken at the line 6—6 on Fig. 5 and viewed in the direction of the arrows.

Figure 7 is a perspective view of the rotatable carrier.

Figure 8 is a similar view of the jolt-part carried by the jolt-piston of the machine and to which the carrier of Fig. 7 is marginally hinged; and Figure 9, a similar view of the power means for rotating the carrier.

The particular illustrated machine comprises a base 10 shown as supported by wheels 11 and provided at one end with jolting mechanism comprising a cylinder 12 to which fluid-pressure for actuating this mechanism is supplied and a piston 13 movable up and down in the cylinder 12 and provided with a platform 14 at its upper end from the marginal edge of which a skirt 15 depends, shedding sand from the body of the piston 13 and the cylinder 12. In accordance with common practice fluid pressure to raise the piston 13 is admitted into the cylinder through a pipe 16 and following the lifting of the piston is permitted to vent, thus permitting the piston to fall and effect, by its abrupt stopping, the desired jolting action, these alternate operations of admitting fluid to the cylinder 12 and venting the latter continuing until the operator, after the desired amount of jolting has been effected, shuts off the supply of fluid to the cylinder 12.

The platform 14 is provided with horizontal, spaced apart arms 16 terminating in upwardly extending portions 17 in which short, longitudinally-alined, shafts 18 are journaled, these shafts projecting at their outer ends beyond the arms 16 and beyond washers 19 on these shafts, and connected at their inner ends with disk-heads 20 provided on their inner, opposed, surfaces with gibs 21 radially disposed on these heads and having stop lugs 22 at their upper ends, considering the parts in the position shown by full lines in Fig. 1.

The carrier for the pattern and for the flask shown at 23 and in which the mold is to be formed, is represented at 24 and comprises a plate portion 25 adapted to rest on the platform 14 in the jolting operation, and laterally extending arms 26 at which the carrier 24 is rigidly connected with the outer ends of the shafts 18, these arms having openings 27 therein to receive the shafts 18 which are keyed to the carrier.

It will thus be understood that inasmuch as the carrier 24 is connected with the platform 14 through the shafts 18, and the platform 14, in turn, is rigidly connected with the piston 13, the carrier is moved up and down with the piston 13 in the jolting movements of the latter, and that the carrier is adapted to be swung at its marginally hinged connection with the arms 16 from the jolting position represented by full lines in Fig. 1 to pattern-drawing position represented by dotted lines in this figure.

Power-operated mechanism for rotating the carrier selectively into the two positions referred to is provided, this mechanism comprising a cylinder 28 in communication with any suitable source (not shown) of fluid pressure, through a valved pipe 29 permitting the actuating fluid to enter the bottom of the cylinder 28 and exhaust therefrom under the control of the operator. Slidable in the cylinder 28 and actuated by the fluid pressure supplied to the latter, is a piston 30 connected, by a connecting rod 31, with the crank-portion 32 of a crank-shaft 33 journaled, at opposite sides of the crank 32, in roller-bearings 34 mounted in recesses 35 in plates 36 secured in openings 37 in the opposite sides of a housing 38, the lower, expanded, portion of which constitutes the cylinder 28.

Secured to the ends of the crank-shaft 33, which is in axial alinement with the shafts 18 when the jolt-piston 13 is in lowermost position, are collars 39 each containing a radial groove 40 at its outer face, the peripheral portions of the collars being recessed as represented at 41 at the opposite ends of the grooves 40.

In the position of the carrier just stated the gibs 21 extend slidingly in the grooves 40, both the gibs and the grooves being vertical. Thus the carrier 24, together with the piston 13 and the parts carried thereby, are free to slide up and down at the gibs 21, in the grooves 40, whereby the jolting mechanism is operable without moving the crank-shaft 33. However, when the piston 13 is in lowermost position and the piston 30 is operated to rotate the crank-shaft 33 the coupling connection of the shaft 33 with the shafts 18, afforded by the interfitting of the gibs 21 with the walls of the grooves 40, causes torque to be applied to the shafts 18 for rotating the carrier 24.

The machine, at the side of the turnover mechanism just described opposite that at which the jolting mechanism is located, is provided with a vertically movable flask rest device represented generally at 42 and shown as of well known construction and provided to receive the flask containing the mold and mounted on the carrier 24, in the swinging of the carrier from the position shown by full lines in Fig. 1 in which the mold is produced, into the position shown by dotted lines in this figure, and by lowering the device 42 separate the pattern from the mold.

The device 42 is shown as formed of a body portion 43 supporting vertically adjustable flask-rests 44, one at each side of the machine, the portion 43 being slidable vertically on rods 45 secured to the base 10 of the machine.

The flask rest device is held normally in raised position as by the spring-tensioned mechanism shown and comprising coil-springs 46 located at opposite sides of the machine and operatively connected at one end with heads 47 pivoted on the stationary frame of the machine and at their other end with arms 48 rigid on levers 49 pivoted at 50 to the stationary frame of the machine, the levers 49 at their outer ends being connected with the body portion 43 of the flask-rest device by links 51 pivoted at their opposite ends to the levers 49 and the body portion 43, respectively. A yoke member 52 connected with the arms 49 affords means engageable by the operator, as by pressing downwardly against it, for vertically depressing the flask-rest device against the tension of the springs 46 to lower the mold away from the pattern.

It is necessary that means be provided for stopping the rotation of the carrier 24, in moving it into pattern-drawing position, when the carrier assumes a position at a right angle to the path of vertical movement of the flask-rest device, these means, in the construction shown, comprising the lugs 22 and the walls of the recesses 41 against which they upwardly engage, and stops, shown as in the form of threaded vertical studs 53, secured to lugs 54 on the housing 38 and having nuts 55 adjustable thereon and engageable by stop-surfaces 56 on the carrier. By this construction, as will be noted, the cantilever action of the carrier 24 is exerted on the stationary rigid housing 38 through lugs 22 and the crank-shaft 33, thus relieving the jolt piston of force tending to lift it, and its associated parts, vertically.

In the jolting operation of the machine the carrier 24 occupies a position in which it flatwise rests on the platform 14 with the flask 23 positioned on the carrier 24 and filled with sand covering the pattern on the carrier, as shown by full lines in Fig. 1.

After the jolting operation has been completed, the sand is struck off level with the top of the flask, more sand being added to the flask, if necessary, and a bottom board 57 then applied to the position shown. The bottom board 57, flask 23 and carrier are then clamped tightly together as by the clamping means illustrated and comprising a bail 58 pivoted at eyes 59 on reduced portions 60 of the collars 39 and a manually operative latch device 61 pivoted on the end of the bail and having a latching lug 62 adapted to hook under a cross-pin 63 on a stud rigid with the carrier, the bail having presser devices 64 forced into engagement with the top of the bottom board 57 upon manipulating the latch 61 to latching position.

The parts in clamped position as stated are then swung to the inverted position shown by dotted lines in Fig. 1 to deliver the flask to the flask rest device, the carrier swinging on the shafts 33 and the flask-clamp, on the collars 39. The latch lever 61 is then released from the pin 63 permitting the clamp to be swung upwardly out of the way and the flask lowered from the pattern on the carrier 24 by lowering the flask-rest device.

As shown, and by preference, the cylinders 12 and 28 of the jolt and carrier-turnover mechanisms are formed as an integral structure as by casting them in one piece, whereby the number of separate parts forming the mechanism are reduced and possibility of these cylinders becoming out of alinement is prevented.

Furthermore in accordance with the preferred illustrated embodiment of my invention, the pattern-plate 25 instead of being centered relative to the jolt cylinder 12 is offset therefrom slightly to the right in Figs. 1 and 3, as represented, to substantially counterbalance the unsymmetrical load of the jolt parts carried by the piston 13, thereby relieving the piston 13 and cylinder 12 of the wear which would otherwise result.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. A molding machine comprising a carrier for the flask, means for jolting said carrier and on which said carrier is rotatably mounted, and means operating independently of the movement of said jolting means for rotating said carrier and relative to which said carrier is movable in the jolting operation.

2. A molding machine comprising a carrier for the flask, means for jolting said carrier and on which said carrier is rotatably mounted, and means for rotating said carrier comprising a power device and a driving connection between said power device and carrier and formed of sections relatively movable in the jolting operation.

3. A molding machine comprising a carrier for the flask, means for jolting said carrier and on which said carrier is rotatably mounted, and means for rotating said carrier comprising a rotatable shaft on the machine, means for rotating said shaft, and a driving connection between said shaft and carrier and formed of sections relatively movable in the jolting operation.

4. A molding machine comprising a carrier for the flask, means for jolting said carrier and on which said carrier is rotatably mounted, and means for rotating said carrier comprising a rotatable shaft on the machine, means for rotating said shaft, and a driving connection between said shaft and carrier comprising portions operatively connected with said shaft and carrier, said portions being relatively slidable in the jolting of said carrier and relatively positioned to permit torque to be applied to said carrier for rotating the latter.

5. A molding machine comprising a rotatable carrier for the flask, means for jolting said carrier and comprising a movable member, rotatable elements journaled on said member and connected with said carrier, a rotatable member, means for rotating said rotatable member, and a driving connection between said rotatable elements and said rotatable member and formed of sections relatively movable in the jolting operation.

6. A molding machine comprising a rotatable carrier for the flask, means for jolting said carrier and comprising a movable member, rotatable elements journaled on said member and connected with said carrier, a rotatable member, means for rotating said rotatable member, and a driving connection between said rotatable elements and said rotatable member and comprising portions relatively slidable in the jolting of said carrier and relatively positioned to permit torque to be applied to said carrier for rotating the latter.

7. A molding machine comprising a marginally hinged carrier for the flask, means for jolting said carrier and on which said carrier is hingedly mounted, and means operating independently of the movement of said jolting means for rotating said carrier and relative to which said carrier is movable in the jolting operation.

8. A molding machine comprising a marginally hinged carrier for the flask, means for jolting said carrier and on which said carrier is hingedly mounted, and means for rotating said carrier comprising a power device and a driving connection between said power device and carrier and formed of sections relatively movable in the jolting operation.

9. A molding machine comprising marginally hinged carrier for the flask, means for jolting said carrier and on which said carrier is hingedly mounted, and means for rotating said carrier comprising a rotatable shaft on the machine, means for rotating said shaft, and a driving connection between said shaft and carrier and formed of sections relatively movable in the jolting operation.

10. A molding machine comprising a marginally hinged carrier for the flask, means for jolting said carrier and on which said carrier is hingedly mounted, and means for rotating said carrier comprising a rotatable shaft on the machine, means for rotating said shaft, and a driving connection between said shaft and carrier comprising portions operatively connected with said shaft and carrier, said portions being relatively slidable in the jolting of said carrier and relatively positioned to permit torque to be applied to said carrier for rotating the latter.

11. A molding machine comprising a marginally hinged carrier for the flask, means for jolting said carrier and comprising a movable member, rotatable elements journaled on said member and connected with said carrier, a rotatable member, means for rotating said rotatable member, and a driving connection between said rotatable elements and said rotatable member and formed of sections relatively movable in the jolting operation.

12. A molding machine comprising a marginally hinged carrier for the flask, means for jolting said carrier and comprising a movable member, rotatable elements journaled on said member and connected with said carrier, a rotatable member, means for rotating said rotatable member, and a driving connection between said rotatable elements and said rotatable member and comprising portions relatively slidable in the jolting of said carrier and relatively positioned to permit torque to be applied to said carrier for rotating the latter.

13. A molding machine comprising a marginally hinged carrier for the flask, means for jolting said carrier and comprising a movable part to which said carrier is pivoted, means for rotating said carrier on said movable part, and means for stopping rotation of said carrier into pattern-drawing position comprising interengaging portions relieving said movable part of said jolt means from upward thrust.

14. A molding machine comprising a marginally hinged carrier for the flask, means for jolting said carrier and comprising a movable part to which said carrier is pivoted, means for rotating said carrier on said movable part, and means for stopping rotation of said carrier into pattern-drawing position comprising a stop on a stationary part of the machine upon which the overhanging portion of said carrier bears and interengaging portions adjacent said axis relieving upward thrust on said movable part of said jolt means.

15. A molding machine comprising a marginally hinged carrier for the flask, means for jolting said carrier and comprising a movable part to which said carrier is pivoted, a rotatable member, means for rotating said member, means actuated by said rotatable member for rotating said carrier on said movable part and means for stopping rotation of said carrier into pattern-drawing position comprising a stop on a stationary part of the machine upon which the overhanging portion of said carrier bears and interengaging portions operatively connected with said carrier and said rotatable member for resisting upward thrust exerted by said carrier.

16. A molding machine comprising a rotatable carrier for the flask, means for jolting said carrier, means for rotating said carrier comprising a rotatable shaft on the machine, means for rotating said shaft, and a driving connection between said shaft and carrier and formed of sections relatively movable in the jolting operation, and means for stopping rotation of said carrier into pattern-drawing position comprising a stop on a stationary part of the machine upon which the overhanging portion of said carrier bears and interengaging portions on said sections mutually engaging for resisting upward thrust exerted by said carrier.

17. A molding machine comprising a rotatable carrier for the flask, means for jolting said carrier, means for rotating said carrier comprising a rotatable shaft on the machine, means for rotating said shaft, and a driving connection between said shaft and carrier comprising portions operatively connected with said shaft and carrier, said portions being relatively slidable in the jolting of said carrier and relatively positioned to permit torque to be applied to said carrier for rotating the latter, and means for stopping rotation of said carrier into pattern-drawing position comprising a stop on a stationary part of the machine upon which the overhanging portion of said carrier bears, and a stop part on the one of said portions which engages the other of said portions and resists upward thrust exerted by said carrier.

18. A molding machine comprising a carrier for the flask, means for jolting said carrier and comprising a movable member, said carrier being rotatably mounted on said movable member, and means operating independently of the movement of said first-named means for rotating said carrier and relative to which said carrier is movable in the jolting operation.

19. A molding machine comprising a marginally hinged carrier for the flask, means for jolting said carrier and comprising a movable member, said carrier being hinged to said movable member, and means operating independently of the movement of said first-named means for rotating said carrier and relative to which said carrier is movable in the jolting operation.

20. A molding machine comprising a rotatable carrier for the flask, means for jolting the carrier and comprising a movable member, and means for rotating said carrier comprising means rotatable on said member and to which said carrier is connected and means for rotating said third-named means comprising tongue and groove, relatively slidable elements connecting said third-named means and said fourth-named means so constructed and arranged as to permit of relative sliding movement of said tongue and groove elements in the operation of said jolt means, and to apply torque to said third-named means for rotating said carrier when said fourth-named means are actuated.

21. A molding machine comprising a carrier for the flask, means for jolting the carrier and comprising a movable member, and means for rotating said carrier comprising means rotatable on said member and to which said carrier is marginally connected and means for rotating said third-named means comprising tongue and groove, relatively slidable elements connecting said third-named means and said fourth-named means so constructed and arranged as to permit of relative sliding movement of said tongue and groove elements in the operation of said jolt means, and to apply torque to said third-named means for rotating said carrier when said fourth-named means are actuated.

22. A molding machine comprising a marginally hinged carrier for the flask, means for jolting said carrier and comprising a movable member having arms, shafts journaled in said arms and to which said carrier is connected, and means for rotating said shafts comprising a second shaft disposed between said first-named shafts, means for rotating said second shaft and driving connections between said first-named shafts and said second shaft and formed of sections relatively movable in the jolting operation.

VANCE S. FIRESTONE.